(12) United States Patent
Quintana et al.

(10) Patent No.: US 6,934,977 B1
(45) Date of Patent: Aug. 30, 2005

(54) TOILET LEAK DETECTION AND OVERFLOW PREVENTION SYSTEM

(76) Inventors: Richard Quintana, 2668 Atlantic Ave., Long Beach, CA (US) 90806; Devon Niccole, 2668 Atlantic, Long Beach, CA (US) 90806

( * ) Notice: Subject to any disclaimer, the term of this patent is extended or adjusted under 35 U.S.C. 154(b) by 0 days.

(21) Appl. No.: 10/285,110

(22) Filed: Oct. 31, 2002

(51) Int. Cl.$^7$ .......................... E03D 11/02; E03D 11/18
(52) U.S. Cl. .................................. 4/427; 4/421; 4/366
(58) Field of Search ............................ 4/427, 421, 366, 4/367, 353

(56) References Cited

U.S. PATENT DOCUMENTS

| | | | | |
|---|---|---|---|---|
| 3,928,874 | A | * | 12/1975 | Albertson ...................... 4/342 |
| 4,547,768 | A | * | 10/1985 | Kulhavy ..................... 340/620 |
| 5,731,758 | A | | 3/1998 | Suttlemyre et al. |
| 5,940,899 | A | * | 8/1999 | Mankin et al. ................ 4/427 |
| 6,016,577 | A | * | 1/2000 | Cooley ........................ 4/427 |
| 6,058,519 | A | * | 5/2000 | Quintana ...................... 4/427 |
| 6,178,569 | B1 | * | 1/2001 | Quintana ...................... 4/427 |
| 6,367,096 | B1 | * | 4/2002 | Quintana ...................... 4/427 |
| 6,671,893 | B1 | * | 1/2004 | Quintana et al. .............. 4/427 |

* cited by examiner

*Primary Examiner*—Henry Bennett
*Assistant Examiner*—Amanda Wieker
(74) *Attorney, Agent, or Firm*—James G O'Neill, Klein, O'Neill & Singh, LLP

(57) ABSTRACT

Water leak detecting or overflow devices for a toilet may be inserted into or formed integrally with the toilet. The devices include at least one water leak sensor assembly mounted in a position in a toilet tank so as to detect the rise and fall of the water level in the toilet tank and an overflow detector in a toilet bowl. If the water level rises and falls a predetermined number of times, or if water continues to flow to the toilet longer than a measured increment of time, a microprocessor operates a normally-open valve and shuts off flow of water to the toilet tank. The devices also include a second sensor, whereby if a flapper remains open or water reaches a level where it might overflow the bowl or tank and stays there for a predetermined period of time, the microprocessor will also shut off flow to the toilet.

20 Claims, 5 Drawing Sheets

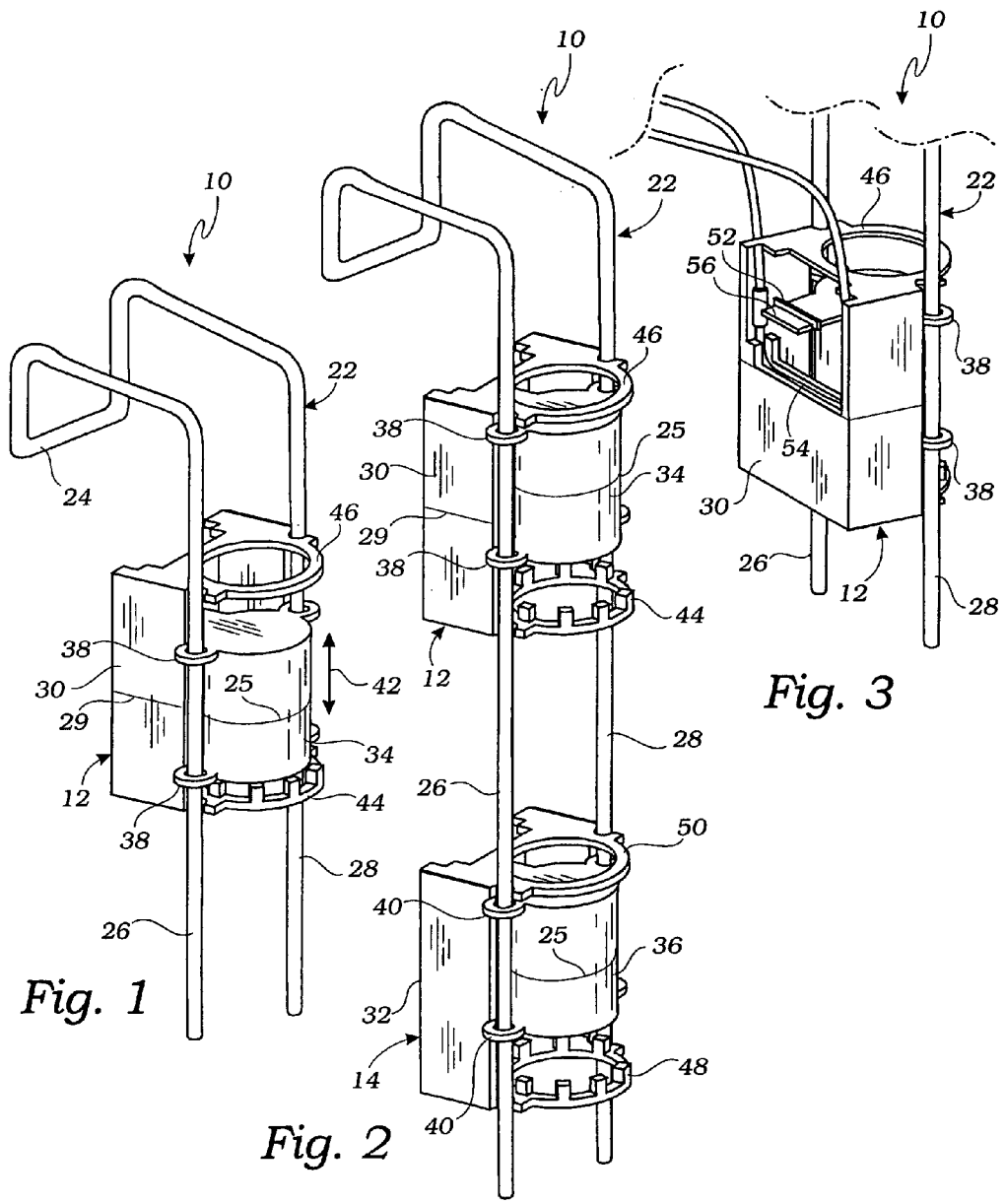

TOILET LEAK DETECTION AND OVERFLOW PREVENTION SYSTEM

BACKGROUND OF THE INVENTION

1. Field of the Invention

This invention relates generally to fluid control devices, and more particularly, to devices adapted to be mounted in or to a toilet for detecting and shutting off any leaks in or around the toilet and/or controlling overflow of water from the toilet bowl or tank.

2. Description of Related Art

As homeowners and those who work in and around certain types of institutions, such as retirement homes, convalescent homes, and the like, are aware, toilet bowls and tanks may leak or overflow for any number of reasons, such as becoming blocked, toilet flappers or valves becoming stuck in the open position, or a person may repeatedly flush a toilet to cause it to overflow. The leaking or overflow of water may cause serious problems, particularly in institutions, such as homes for the aged, since older people may slip and fall, or be subjected to diseases by such flooding waters. Furthermore, with water conservation becoming increasingly more important, the detecting and prevention of water leakage and wastage has become a priority.

Many patents have disclosed mechanical and electrically operated water overflow control devices to prevent the overflowing of toilets. Examples of such patents include U.S. Pat. Nos. 6,058,519 and 6,178,569 in the name of Richard Quintana, one of the inventors named herein. Additionally, U.S. Pat. No. 6,367,096 to Richard Quintana discloses a system that detects water leaks and shuts off the flow of water to a toilet. The devices disclosed in these patents work well for their intended purposes, but fail to disclose or teach leak detection and overflow prevention systems, of the type disclosed herein.

The present invention incorporates one or more devices formed integrally with or removably held in a toilet bowl and/or in the interior of a toilet tank to detect leaks, an open flapper valve, and/or an overflow condition, and to selectively operate a shut-off device to control the flow of water to the toilet tank, in a more expeditious, reliable and cheaper manner.

SUMMARY OF THE INVENTION

Accordingly, it is a general object of the present invention to provide an improved and simplified leak detection and overflow prevention system. It is a particular object of the present invention to provide an improved and simplified toilet leak detection and overflow prevention system electrically connected to a water flow control device. It is yet another particular object of the present invention to provide an improved and simplified leak detection and overflow prevention system, having one or more detecting portions, held in or to a toilet tank and/or toilet bowl. It is yet another particular object of the present invention to provide an improved and simplified float controlled leak detection and overflow prevention device having one or more sensors therein, fixedly or removably held in or to a toilet. And, it is still another particular object of the present invention to provide an improved and simplified water leak detection and overflow prevention system incorporated in or to a toilet, including one or more float-operated devices, a flapper sensing device, and a toilet bowl overflow prevention device for operation of a water flow shutoff device.

These and other objects and advantages of the present invention are achieved by providing a system held in or to a toilet having leak detecting, overflow detecting and flap-open detecting means, connected to means for activating a normally-open valve for controlling water flow to the toilet.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 1 is a perspective view of a leak detection and overflow prevention device of the present invention adapted to be mounted in a toilet tank and connected to a device for activating a valve means to control water flow to the toilet tank;

FIG. 2 is a further perspective view of a device of the present invention having two sensor/float means therein;

FIG. 3 is a further perspective view of the rear of the device of FIG. 1;

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified leak detection and overflow prevention system.

Figure 4:
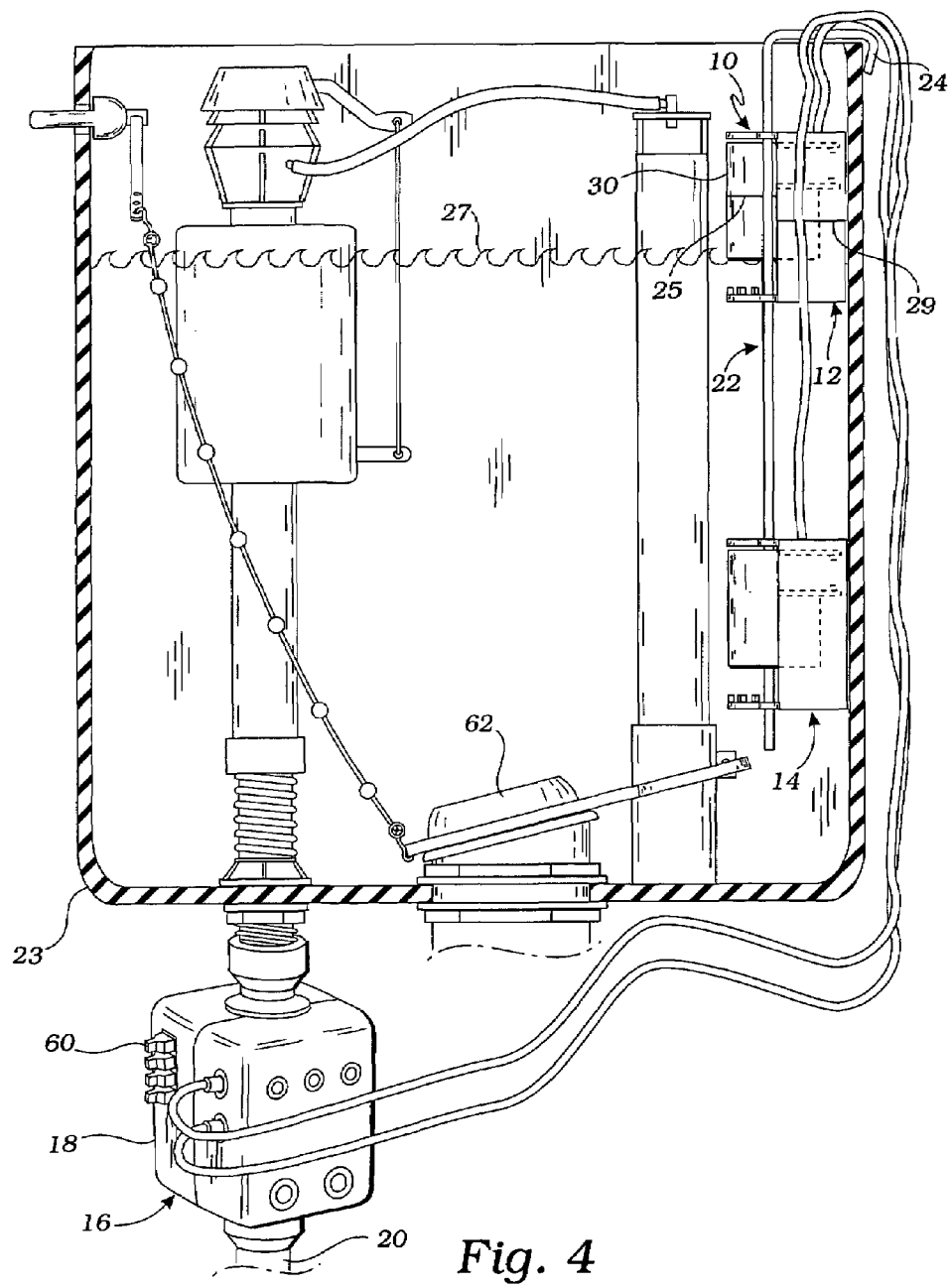
FIG. 4 is a cross-sectional view of a toilet tank having the device of FIG. 2 held therein.

A first embodiment of a system is shown at 10 and has one or more first detectors 12, 14, such as leak detectors or water level sensors. These leak detectors 12, 14 are electrically or otherwise operated, as by means of a lead, infrared, microwave, or RF to a valve 16, such as a gear or solenoid-actuated valve, held in a housing 18, connected to a waterline 20 below a toilet tank 23 of a toilet (see FIG. 4). The one or more first or leak detectors or sensors 12, 14 may be held in any desired manner in the toilet tank 23, for example as shown in FIG. 4 they may be mounted on a holding means 22 supported on a rim or otherwise in the toilet tank 23. The holding means 22 may take any desired form, such as a flexible or rigid assembly in the form of a clip, or an assembly having an upper hook portion 24 and a pair of arms or legs 26, 28 on which are slidably supported the one or more leak detectors or sensors 12, 14. The detectors 12, 14 are adjustable along or on the arms 26, 28, so as to be supported in the water tank at desired levels, as explained more fully below.

The first or leak detectors or sensors 12, 14 may take any desired form such as capacitance, infrared, laser, magnetic, microswitch, RF, sound, or any other type of water level or leak sensor that is activated by rising and falling levels of water in a toilet tank. In one preferred embodiment, the detector elements 12, 14 have bodies 30, 32, slidably held or mounted on the arms 26, 28. The bodies 30, 32 include float elements 34, 36 held therein with ring elements 38, 40 secured thereto and slidably held on the arms 26, 28. The floats 34, 36 are movable with the water level in the toilet tank 25, in the direction of arrow 42 (see FIG. 1) between bottom and top portions 44, 46 and 48, 50. For example, with the device 10 held in toilet tank 23 (FIG. 4), the top or upper sensor 12 may be placed on the holding element 22 so that the float 34 is near to or just touches the top portion 46 of the body 30. This position places a line 25 on the float 34 at the waterline 27, above or at a line 29 formed on the body 30. The device 10 may, of course, be supported in the tank 23 in any desired manner, such as on an overflow or inlet pipe by a clip or other similar means.

As best shown in FIG. 3, magnets 52 and magnetic reed switches 54 are held in at the rear of the floats 34, 36 and the bodies 30, 32. The magnets 52 are preferably held on fingers 56 secured to the floats 34, 36. The magnets 52 are preferably spaced from the reed switches 54, when the water level 27 in the toilet tank 23 reaches the desired level, shown in FIG. 4. However, when the toilet is flushed, the top float 34 and the bottom float 36 will be lowered, thereby lowering the magnets 52 whereby they will be sensed by the magnetic reed switches 54 to connect to a microprocessor held in housing 18. The housing 18 includes a switch or other means 60, such as a dip switch having a plurality of switching elements to enable a predetermined time limit to be incrementally set, whereby if either or both floats 34, 36 do not return to their start positions, the microprocessor will operate the valve in the housing 18 to shut off water flow from waterline 20 to the water tank 23. Furthermore, if there is a slow leak and the top float 34 rises and falls a pre-selected number of times, or takes over a predetermined amount of time to drop, within a specified time period, because of the slow draining and refilling of the tank, the microprocessor will determine that there is a leak, therefore, preferably sounding or sending an alarm or warning and shutting the valve 16 to stop water flow to the tank 23.

Likewise, if water is continuously running into the tank for any reason, such as if a flapper valve 62 is stuck open; either or both floats will stay down so that the circuit or circuits remain closed. The microprocessor will also shut off water flow in this situation, after the passage of a predetermined period of time, to prevent toilet overflow and/or continued water leakage. When the valve in housing 18 moves to the closed position, preferably an alarm, an overflow LED light and/or an RF-operated battery-operated remote light for the hearing impaired will be actuated. Additionally, the circuit may include a relay connected to an auto dialer to alert a pager or telephone system that a problem exists.

The water leak detectors or sensors 12, 14 may be mounted within the water tank 23 in any desirable manner, as by hanging the holding means 22 by hook 24 over an edge of the water tank or hanging it or mounting the leak detectors on a pipe or pipes therein. However, the leak detectors must be held in a position to allow the floats 34, 36 to easily and smoothly move up and down with the water level in the water tank.

The valve 16 in housing 18 may take any desired form, such as a solenoid operated ball, disk, or other type valve, but is preferably of the type set forth in U.S. Pat. No. 6,367,096, referred to above, and incorporated herein in its entirety by this reference thereto.

A colored cleaning or dye dispenser of any type, such as shown at 64 may be held in the water tank 23. This dye dispenser may be of the standalone type, or may be connected to either or both of the leak detectors or sensors 12, 14 so that a colored cleaner or dye may be released if a leak occurs to flow into the toilet bowl and give a visual indication of the leak.

Figure 9:
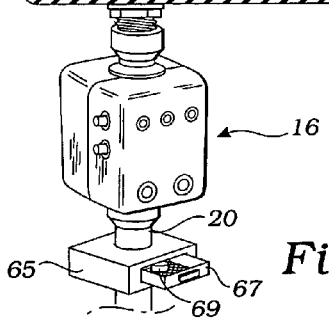
FIG. 9 is a perspective view, partially in cross-section of a control valve connected in the waterline below a toilet tank having a replaceable cleaner cartridge inserted and held in the waterline.

Additionally, as shown in FIG. 9, a replaceable cleaner cartridge holder 65 may be inserted in the waterline 20 leading to the toilet tank 23, before or after housing 18, or may be mounted in the housing itself. The cleaner cartridge holder 65 includes an opening into which a removable compartment 67 slides in and out, to enable a water cleaning cartridge or tablet 69 to be inserted for cleaning water flowing therethrough.

If a leak alarm and a leak alarm LED light are contained in the housing 18, they will be turned on if the valve 16 is actuated to shut off water flow to the tank. The alarm may be turned off, if desired, and the leak repaired, and/or a stuck flapper may be closed or repaired. Also, if closed, an open valve button may be pressed to open the water valve 16 to allow water to flow back to the toilet tank 23.

When the valve 16 is returned to its original open position, the microprocessor will again start its leak detecting monitoring. The switch 60 and/or microprocessor can be set or programmed to monitor for any time intervals or other desired parameters.

Figure 5:
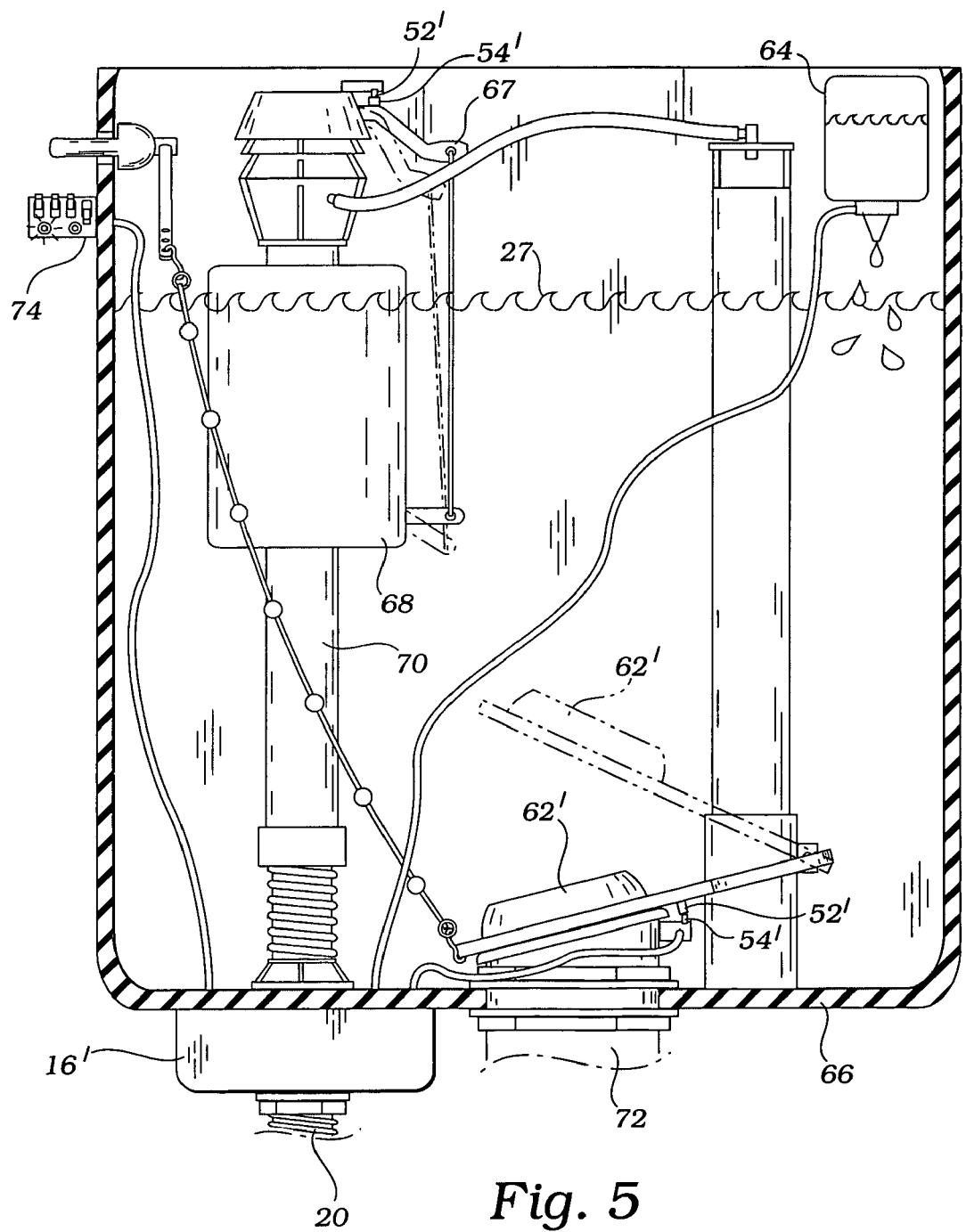
FIG. 5 is a cross-sectional view of a further toilet tank having a leak detecting device and a flap-open or overflow indicating device incorporated therein, and connected to a shutoff device for the toilet tank.

Turning now to FIG. 5, there shown is a toilet tank 66 having a magnet 52' held in or integrally formed with a valve operating arm 67, connected to a float 68 held on a fill or stand pipe 70, held in the toilet. Additionally, a flapper 62', to control a water outlet 72, has a further magnet 52' and a reed switch 54' placed in any convenient position or arrangement on or near the flapper. Additionally, a magnet 52' and a reed switch 54' may be placed above, on or near the arm 67. A valve 16' is preferably integrally formed with the toilet tank 66 at a lower end thereof, and connected to inlet 20. The valve 16' is also electrically or otherwise connected to a normally-closed circuit including the reed switches 54', so as to be opened to close the valve 16' if a water leak or overflow is detected by magnet 52', or the flapper 62' remains open past a predetermined time period. A unit 74 having one or more displays and/or warning lights, such as LEDs, and a plurality of switches, is placed on or near the exterior of the toilet tank 66, or on or adjacent to the valve 16', to allow various time limits and other actions of the microprocessor controlled valve 16' to be selectively adjusted or programmed.

As shown in FIGS. 6–11, further embodiments of the present invention may include various combinations of floats and/or magnets and reed switches, water level detectors or sensors, and other overflow detectors.

Figure 6:
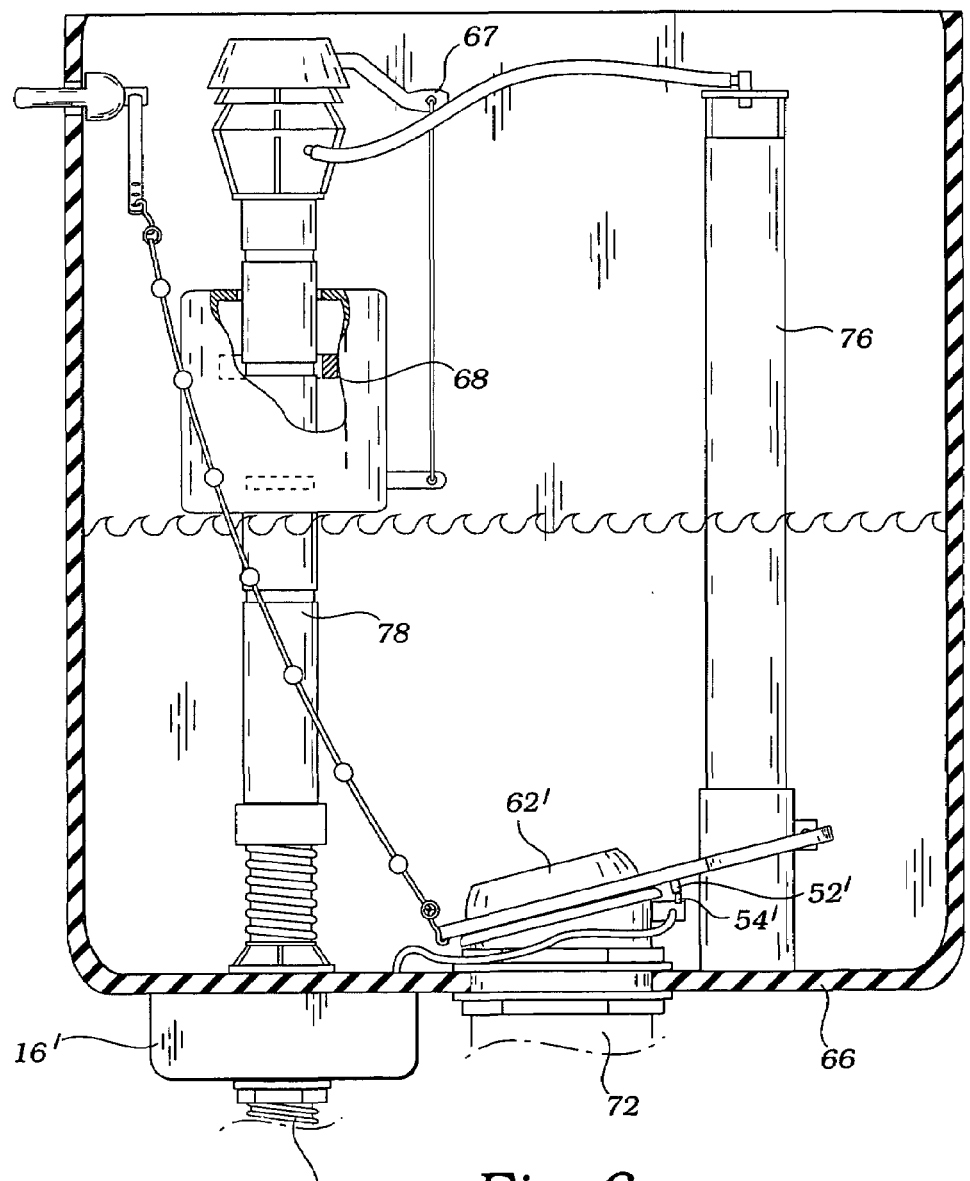
FIG. 6 is a further cross-sectional view of a toilet tank showing a toilet overflow device held therein.
Figure 10:
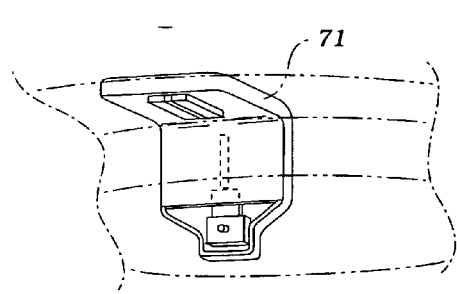
FIG. 10 is a perspective view of a water level sensor secured to or in a toilet bowl.
Figure 11:
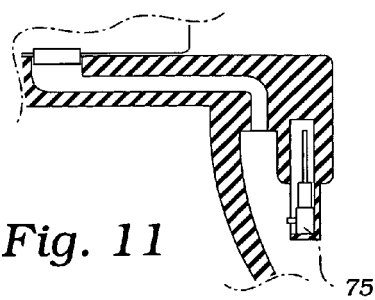
FIG. 11 is a cross-sectional view of a toilet bowl having a further water level sensor integrally formed therein.

For example, FIG. 6 shows a cross-section of a toilet tank 66 having a leak or overflow sensor 68 secured in a float, or overflow sensors or water level detectors may be mounted or secured elsewhere in the tank or at 71, 75 in the toilet bowl (see FIGS. 10 and 11). These leak or overflow sensors 68, 71, 75 are connected to the valve means 16' in a manner similar to the detectors 12, 14 described above, to stop flow of water to the toilet tank 66, if any of the sensors is activated. For example, if any of the sensors is actuated or moved by the water level in the tank or bowl and does not return to a neutral position it will cause the microprocessor to close the valve 16'.

Figure 7:
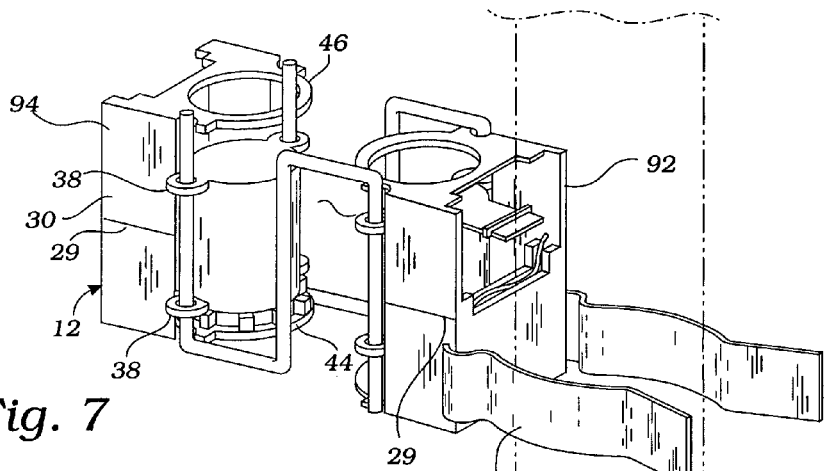
FIG. 7 is a further perspective view of leak and overflow assemblies held together and to a toilet tank overflow pipe by a clip.
Figure 8:
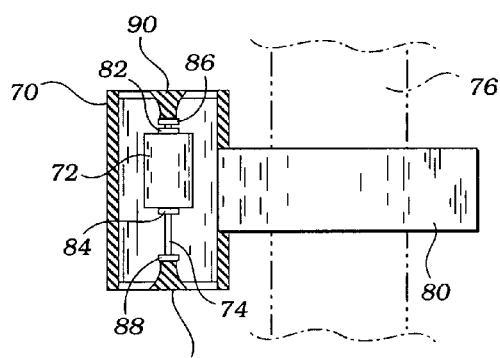
FIG. 8 is a cross-sectional view of a further detector having a single float and a plurality of operating means therein.

FIGS. 7 and 8 show further embodiments of floats held in the toilet tank 66 on or secured to an overflow pipe 76 or a water inlet line 78 in any convenient manner. For example, as shown in FIG. 7, a single housing 70 may have a float 72 held on a slide post 74. The housing 70 may be closed or open and may be removably held on or permanently secured to the overflow pipe 76 or the inlet pipe 78 in the toilet tank, as by means 80, such as a clip, a sliding or ratcheting means, or an element secured around the pipes. For example, the housing 70 may be mounted in or on the overflow pipe 76 in a desired position within the toilet tank and magnets 82, 84 held on opposed ends of the float 72 to operate reed switches 86, 88 mounted at the ends of the slide post 74, adjacent ends 90, 92 of the housing 70. Therefore, with the housing 70 mounted in the selected position with the float 72 in the center of the housing, the float moves with the water level. Then, if the water level moves the float 72 downwardly to where the magnet 84 actuates the reed switch 88, a signal will be sent to the microprocessor in housing 18. If the float remains in this position past a predetermined time, or actuates the reed switch 88 a predetermined number of times, as explained above, the valve 16 will be operated to shut off water flow to the tank.

Furthermore, if the water level rises to move the float 72 upwardly to where the magnet 82 actuates the reed switch 86, this would indicate a potential tank overflow, and the valve 16 would be operated to shut off water flow to the tank.

The single housing 70 could be replaced by a pair of tandem mounted sensors 92, 94, similar to sensors 12, 14. The first sensor 92 includes a clip 96 to hold it to an overflow pipe and operates in the same manner as sensor 12, explained above. However, the second sensor 94 is raised above the sensor 92 and is actuated by water moving its float upwardly, to thereby signal that there is a potential over-the-top overflow. This will shut off water flow to the tank.

All of the sensors shown in FIGS. 7–11 may be tied into or work in conjunction with the further magnets 52' and reed switches 54' placed on the flapper 62' adjacent the water outlet 72, controlled by the flapper. Additionally, the devices or sensors of the present invention may be formed integrally in a toilet, if desired.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A combination overflow control and leak detecting system for a toilet, comprising:
    a first magnetic detector secured in a toilet tank for detecting the level of water in the toilet tank;
    the first magnetic detector being adjustably mounted on a float held in the toilet tank and including means activated by rising and falling levels of water in the toilet tank;
    a second magnetic detector adjustably mounted on a second float held in the toilet for detecting an overflow condition in the toilet; and
    a valve means connected to the magnetic first detector and the second magnetic detector for controlling the flow of water to the toilet when actuated by either the first magnetic detector or the second magnetic detector.

2. The combination overflow control and leak detecting system of claim 1, further including magnetic reed switches cooperating with the first magnetic detector and the second magnetic detector.

3. The combination overflow control and leak detecting system of claim 2 wherein the the float is movably held in a body adjustably mounted in the toilet.

4. The combination overflow control and leak detecting system of claim 3 wherein the magnetic reed switches are secured in the body.

5. The combination overflow control and leak detecting system of claim 1 wherein the first magnetic detector is secured in a water line in the toilet tank and the second magnetic detector has at least a portion secured on a flapper in the toilet tank.

6. The combination overflow control and leak detecting system of claim 5, further including magnetic reed switches cooperating with the first magnetic detector and the second magnetic detector.

7. The combination overflow control and leak detecting system of claim 1 wherein the first magnetic detector is a magnet cooperating with the float held in the toilet tank.

8. The combination overflow control and leak detecting system of claim 7 wherein the first magnetic detector and the second magnetic detector are mounted on floats that are permanently held in the toilet tank.

9. A combination overflow control and leak detecting system for a toilet tank, comprising:
    a toilet tank having a waterline connected thereto;
    a microprocessor-operated, normally-open valve, including an electrical power source held in a housing, connected in the waterline to control the flow of water to the toilet tank;
    a first water level sensor and a second water level sensor mounted in the toilet tank;
    means for connecting the first water level sensor and the second water level sensor to the microprocessor, and
    a time-increment adjusting means cooperating with the microprocessor for controlling the flow of water into the toilet tank if either the first water level sensor or the second water level sensor detects a leakage of water and sends a signal to close the normally-open valve.

10. The combination overflow control and leak detecting system of claim 9 wherein the first water level sensor and the second water level sensor are adjustably held in an assembly removably mounted in the toilet tank.

11. The combination overflow control and leak detecting system of claim 10 wherein the first water level sensor and the second water level sensor are magnetic means secured in the toilet tank.

12. The combination overflow control and leak detecting system of claim 11, further including magnetic reed switches cooperating with the magnetic means.

13. The combination overflow control and leak detecting system of claim 12 wherein the magnetic means are secured to floats, which floats are movably held in bodies slidably mounted on holding means.

14. The combination overflow control and leak detecting system of claim 13 wherein the magnetic reed switches are secured in the bodies.

15. The combination overflow control and leak detecting system of claim 9 wherein the first water level sensor is secured in a water line in the toilet tank and the second water level sensor has at least a portion secured on a flapper in the toilet tank.

16. The combination overflow control and leak detecting system of claim 15 wherein the first water level sensor and the second water level sensor are magnetic means secured to floats.

17. The combination overflow control and leak detecting system of claim 16, further including magnetic reed switches cooperating with the magnetic means.

18. A combination overflow control and leak prevention system for a toilet comprising:

a first magnetic detector integrally formed with a toilet tank for detecting any water leaks in the toilet tank;

the first magnetic detector being connected to a valve controlling flow of water to the toilet tank; and a second magnetic detector held in the toilet for detecting overflow conditions in the toilet and being connected to the valve controlling flow of water to the toilet tank.

19. The combination overflow control and leak prevention system of claim 18 wherein the second magnetic detector is integrally formed with the toilet.

20. The combination overflow control and leak prevention system of claim 19 wherein the second magnetic detector is a magnetic reed switch.

* * * * *